United States Patent
Zhao et al.

(10) Patent No.: US 7,840,052 B2
(45) Date of Patent: Nov. 23, 2010

(54) RESTORATION OF THE NUCLEAR MEDICINE 2D PLANAR IMAGE BY ITERATIVE CONSTRAINED DECONVOLUTION

(75) Inventors: Zuo Zhao, Palo Alto, CA (US);
Lingxiong Shao, Saratoga, CA (US);
Jinghan Ye, Freemont, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 859 days.

(21) Appl. No.: 11/719,420

(22) PCT Filed: Nov. 4, 2005

(86) PCT No.: PCT/IB2005/053629
§ 371 (c)(1),
(2), (4) Date: May 16, 2007

(87) PCT Pub. No.: WO2006/054192
PCT Pub. Date: May 26, 2006

(65) Prior Publication Data
US 2009/0202125 A1    Aug. 13, 2009

Related U.S. Application Data

(60) Provisional application No. 60/628,638, filed on Nov. 17, 2004.

(51) Int. Cl.
*G06K 9/40* (2006.01)
*G06T 5/20* (2006.01)
(52) U.S. Cl. .................. 382/131; 382/255; 382/275
(58) Field of Classification Search ........... 382/131, 382/254, 255, 275, 279
See application file for complete search history.

(56) References Cited

U.S. PATENT DOCUMENTS

| | | | |
|---|---|---|---|
| 5,047,968 A | 9/1991 | Carrington et al. | |
| 5,331,553 A | 7/1994 | Muehllehner et al. | |
| 5,532,490 A * | 7/1996 | Gullberg et al. | 250/363.04 |
| 5,565,684 A | 10/1996 | Gullberg et al. | |
| 5,596,198 A * | 1/1997 | Perez-Mendez | 250/370.11 |
| 6,171,243 B1 | 1/2001 | Gagnon et al. | |

(Continued)

FOREIGN PATENT DOCUMENTS

WO          03090113 A1    10/2003

OTHER PUBLICATIONS

Sastry. "Iterative Constrained Deconvolution Methods." Apr. 2002, pp. 1-6. Available at www.plexar.com.*

(Continued)

*Primary Examiner*—Jon Chang

(57) ABSTRACT

A medical imaging system (10) includes at least one radiation detection head (16) disposed adjacent a subject receiving aperture (18) to detect radiation from a subject. The detected radiation is reconstructed into at least one initial 2D projection image (μ). Resolution in each initial 2D image (μ) is restored by using the extended iterative constrained deconvolution algorithm by incorporating different estimates of the system response function which estimates correspond to different distances between the detection head and the origins of the detected radiation. Measured response functions are used to restore a series of images. The optimal image is determined by automatic searching with the figure of merit, by user's observation, or by using blind deconvolution for a concurrent estimating of the system response function and updating the original image.

23 Claims, 4 Drawing Sheets

U.S. PATENT DOCUMENTS

| | | | |
|---|---|---|---|
| 6,381,349 | B1 | 4/2002 | Zeng et al. |
| 6,388,244 | B1 | 5/2002 | Gagnon |
| 6,528,793 | B1 | 3/2003 | Chen et al. |
| 6,539,103 | B1 | 3/2003 | Panin et al. |
| 6,670,614 | B1 | 12/2003 | Plut et al. |
| 7,091,990 | B2 | 8/2006 | Ganser et al. |
| 7,139,067 | B2 * | 11/2006 | Pohle et al. ............ 356/5.04 |
| 7,197,193 | B2 * | 3/2007 | Li et al. .................. 382/285 |
| 7,602,989 | B2 * | 10/2009 | Biggs et al. ............. 382/260 |
| 2003/0002746 | A1 | 1/2003 | Kusaka |
| 2003/0228053 | A1 | 12/2003 | Li et al. |

OTHER PUBLICATIONS

Inouye et al. "On-line Algorithms for Blind Deconvolution of Multichannel Linear Time-Invariant Systems." Proceedings of the IEEE Signal Processing Workshop on Higher-Order Statistics, Jul. 21, 1997, pp. 204-208.*

Jirik et al. "Two-dimensional Blind Iterative Deconvolutoin of Medical Ultrasound Images." 2004 IEEE Ultrasonics Symposium, vol. 2, Aug. 23, 2004, pp. 1262-1265.*

Ayers et al. "Iterative Blind Deconvolution Method and its Applications." Optics Letters, vol. 13, No. 7, Jul. 1988, pp. 547-549.*

Urs et al. "Restoration of Digital Multiplane Tomosynthesis by a Constrained Iteration Method." IEEE Transactions on Medical Imaging, vol.MI-3, no. 3, Sep. 1984, pp. 141-148.*

Kundur, D., et al.; Blind Image Deconvolution; 1996; IEEE Signal Processing Magazine; pp. 43-64.

Liu, Y.-H., et al.; A Novel Geometry for SPECT Imaging Associated with the EM-Type Blind Deconvolution Method; 1998 IEEE Trans. on Nuclear Science; 45(4)2095-2101.

Mignotte, M., et al.; Three-Dimensional Blind Deconvolution of SPECT Images; 2000; IEEE Trans. on Biomedical Engineering; 47(2)274-280.

Mignotte, M., et al.; Comparison of deconvolution techniques using a distribution mixture parameter estimation: Application in single photon emission computed tomography imagery; 2002; Journal of Electronic Imaging; 11(1)11-24.

* cited by examiner

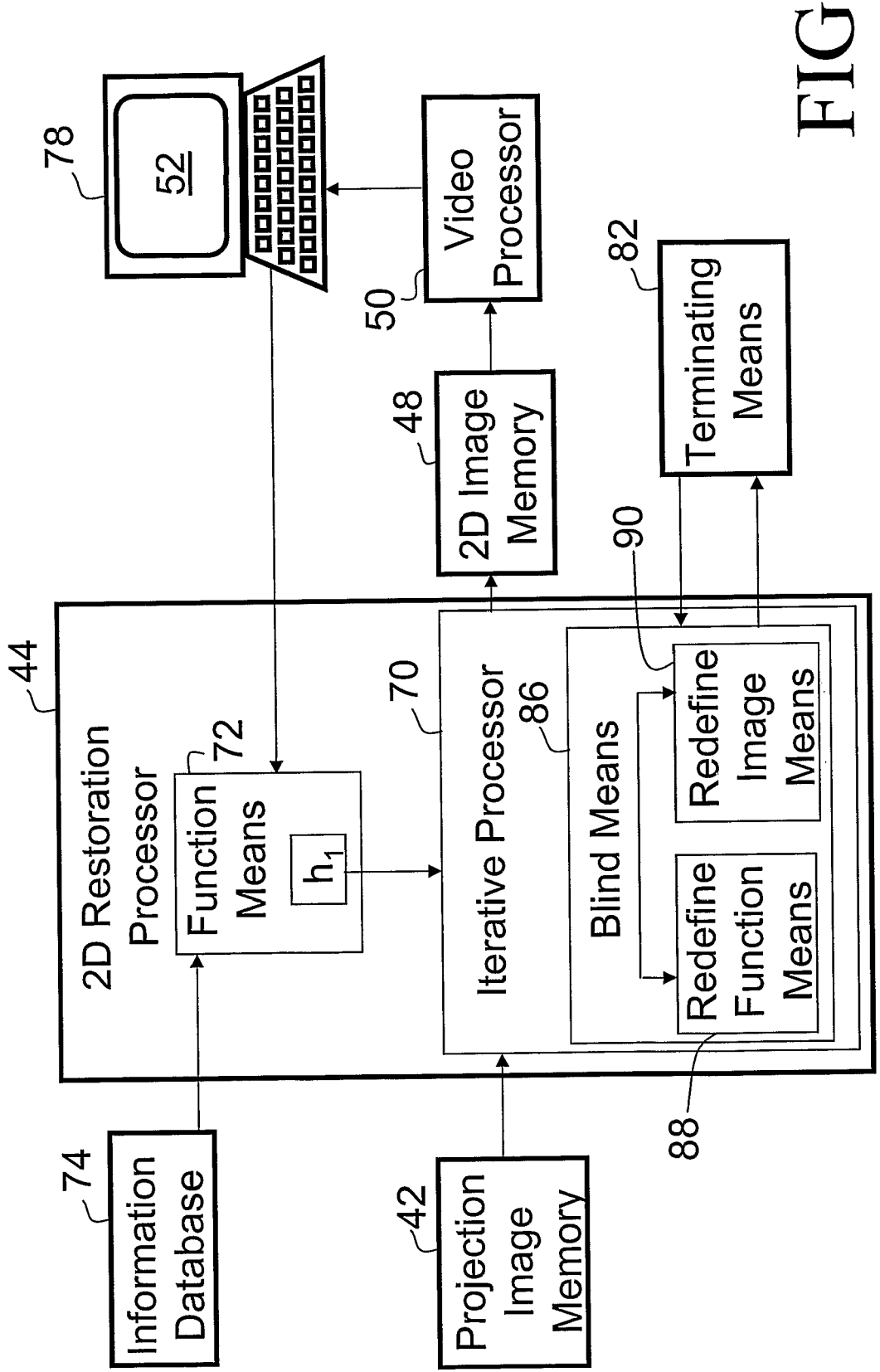

RESTORATION OF THE NUCLEAR MEDICINE 2D PLANAR IMAGE BY ITERATIVE CONSTRAINED DECONVOLUTION

CROSS REFERENCE TO RELATED APPLICATIONS

This application claims the benefit of U.S. provisional application Ser. No. 60/628,638 filed Nov. 17, 2004, which is incorporated herein by reference.

The present invention relates to the nuclear medicine diagnostic imaging systems and methods. It finds particular application in conjunction with the Single Photon Emission Tomography (SPECT) systems and will be described with particular reference thereto. It will be appreciated that the invention is also applicable to other imaging systems such as Positron Emission Tomography systems (PET), Computed Tomography systems (CT), x-ray imaging, and the like.

Nuclear imaging employs a source of radioactivity to image the anatomy of a patient. Typically, a radiopharmaceutical is injected into the patient. Radiopharmaceutical compounds contain a radioisotope that undergoes gamma-ray decay at a predictable rate and characteristic energy. One or more radiation detectors are placed adjacent to the patient to monitor and record emitted radiation. Sometimes, the detector is rotated or indexed around the patient to monitor the emitted radiation from a plurality of directions. Based on information such as detected position and energy, the radiopharmaceutical distribution in the body is determined and an image of the distribution is reconstructed to study the circulatory system, radiopharmaceutical uptake in selected organs or tissue, and the like.

In a traditional scintillation detector, the detector has a scintillator made up of a large scintillation crystal or matrix of smaller scintillation crystals. In either case, the scintillator is viewed by a matrix of sensors. A commonly employed sensor is a photomultiplier tube ("PMT"). A collimator, which includes a grid- or honeycomb-like array of radiation absorbent material, is located between the scintillator and the subject being examined to limit the angle of acceptance of radiation which impinges on the scintillator. Each radiation event impinging on the scintillator generates a corresponding flash of light (scintillation) that is seen by the PMTs. Based on the outputs from the PMTs, the gamma camera maps radiation events, i.e., it determines the energy and position of radiation rays impinging the scintillator.

Image quality of the SPECT images is determined by a count sensitivity of the detector and geometry of the collimator. Generally, it is difficult to obtain the high quality SPECT images because of the limited spatial resolution due to various factors including system parameters, such as collimator geometry, non-linear PMT response, quantum mechanical probabilities, and the like. The image blurring or degradation is commonly expressed as a point spread function (PSF).

Restoration techniques, which have been proposed to improve the planar (2D) image resolution, employ classical inverse filters such as Wiener filter, count-dependent Metz filter, maximum entropy-based filter, power spectrum equalization filter and the like. However, the proposed inverse filtering techniques assume that the point spread function is depth independent, e.g., PSF is known and defined at certain depth. One of the restoration methods, an iterative constrained deconvolution, has been extended to employ an unknown point spread function or so called blind deconvolution to reconstruct the 3D SPECT images by using the projection information to get a correlation between projections. However, for the 2D nuclear medicine planar images, such correlation information does not exist.

The restoration of the nuclear medicine images is complex primarily due to the fact that the image blurring or a point spread function depends on the distance between the radiation decay event and the camera, e.g. it is depth dependent. The exact point spread function of the resulting image is typically unknown because the image is a compilation of information from different depths. Additionally, the depth of the organ of interest may vary from one study to another, and, therefore, it is difficult to predict the point spread function for a given study in the case of planar image.

The present invention provides a new and improved imaging apparatus and method which overcomes the above-referenced problems and others.

In accordance with one aspect of the present invention, a medical imaging system is disclosed. At least one radiation detection head is disposed adjacent a subject receiving aperture to detect radiation from a subject. A means reconstructs the detected radiation into at least one initial 2D projection image. An iterative constrained deconvolution means iteratively restores resolution of each initial 2D image with a plurality of system response functions which is each representative of a corresponding distance between the detection head and an origin of the detected radiation.

In accordance with another aspect of the present invention, a method of medical imaging is disclosed. Radiation data is detected from a subject. The detected radiation is reconstructed into an initial 2D image. Resolution in the initial 2D image is iteratively restored by a use of an iterative constrained deconvolution which applies a plurality of system response functions which functions correspond to distances between the detection head and an origin of the detected radiation.

One advantage of the present invention resides in increased spatial resolution.

Another advantage resides in reduction of noise in the reconstructed 2D images.

Another advantage of the present invention resides in increased accuracy of the reconstructed image.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

FIG. 4 is a diagrammatic illustration of another portion of an imaging system.

DETAILED DESCRIPTION

Figure 1:
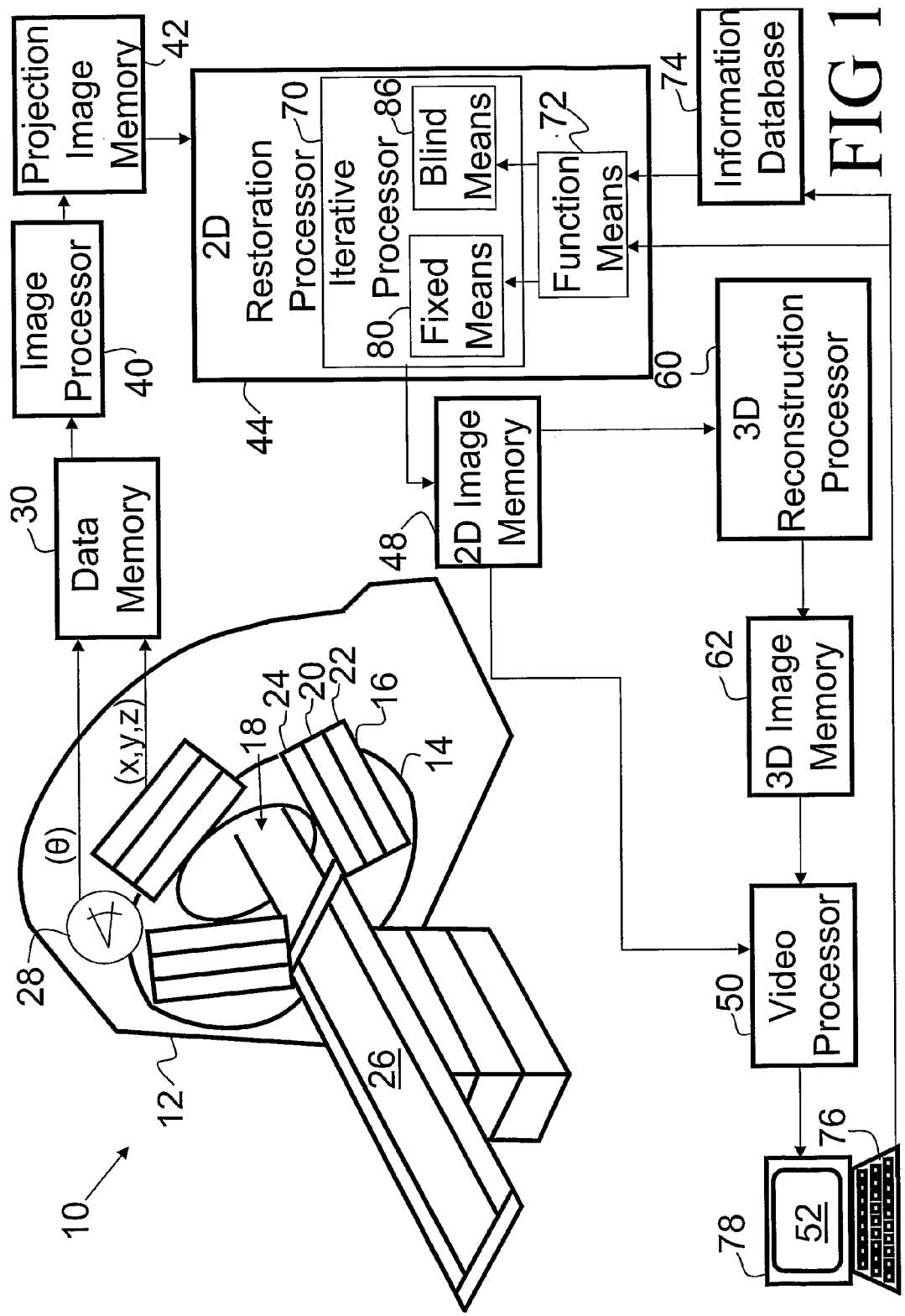
FIG. 1 is a diagrammatic illustration of an imaging system.

With reference to FIG. 1, a nuclear imaging system 10 typically includes a stationary gantry 12 that supports a rotatable gantry 14. One or more detector heads 16 are carried by the rotatable gantry 14 to detect radiation events emanating from a region of interest or examination region 18. Each detector head includes two-dimensional arrays of detector elements or a scintillator 20. Each head 16 includes circuitry 22 for converting each radiation response into a digital signal indicative of its location (x, y) on the detector face and its energy (z). The location of an event on the scintillator 20 is resolved and/or determined in a two dimensional (2D) Cartesian coordinate system with nominally termed x and y coordinates. However, other coordinate systems are contemplated. A collimator 24 controls the direction and angular spread, from which each detector element of the scintillator 20 can receive radiation, i.e., the scintillator 20 can receive radiation only along known rays. Thus, the determined location on the scintillator 20 at which radiation is detected and the angular position of the camera 16 define the nominal ray along which each radiation event occurred. Due to the limited height of the collimator, the physical size of its aperture, physics of detection, and other system factors, there is uncertainty of the actual ray that traveled from the radiation event to the detector. The potential rays spread with distance from the detector with the positional uncertainty at any given distance being given by a point spread function (PSF).

Typically, an object to be imaged is injected with one or more radiopharmaceuticals or radioisotopes and placed in the examination region 18 supported by a couch 26. Few examples of such isotopes are Tc-99m, Ga-67, and In-131. The presence of the radiopharmaceuticals within the object produces emission radiation from the object. Radiation is detected by the detector heads 16 which are able to be angularly indexed or rotated around the examination region 18 to collect the projection emission data at one or more selected projection directions. The projection emission data, e.g. the location (x, y) and/or energy (z), and an angular position (θ) of each detector head 16 around the examination region 18 (e.g., obtained from an angular position resolver 28) are stored in a data memory 30. The projection data from each selected projection direction is conveyed to an image processor 40 which reconstructs a projection image, which is stored in a projection image memory 42.

Figure 2:
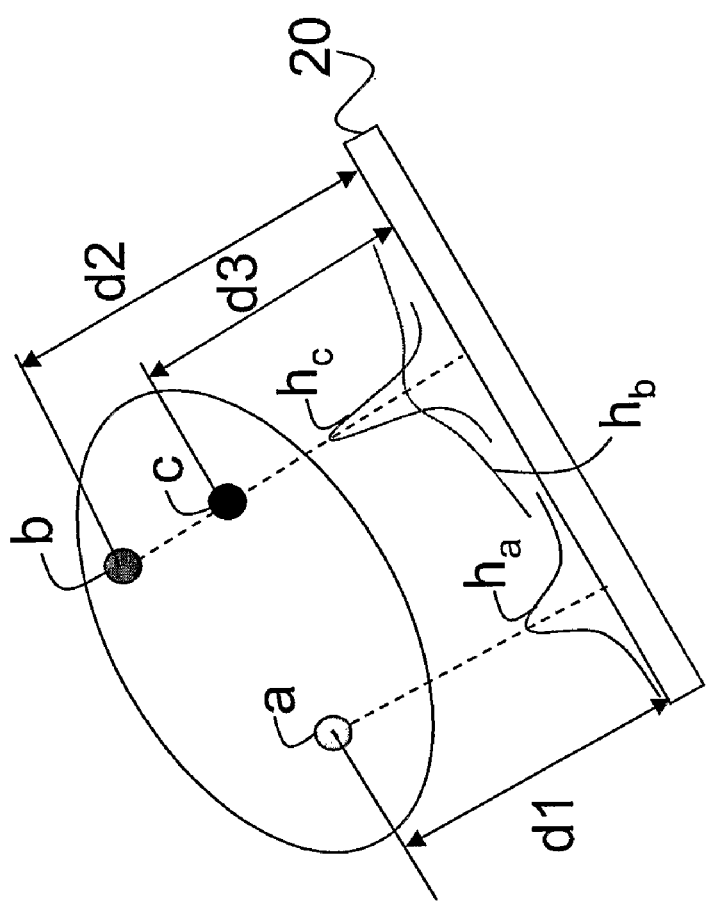
FIG. 2 diagrammatically illustrates point spread functions for three points.

A 2D resolution restoration processor 44 restores 2D images, such as produced by total body bone scan, tumor scan, and other scans. As described in a greater detail below, the image is de-blurred or refocused by deconvolution. The blurring or a point spread function depends on the distance between the radiation event and the detector 20. In FIG. 2, three point sources a, b, c are illustrated at different depths d1, d2, d3. The radiation data from the points b and c are collected in the same detector area. However, a point's b point spread function $h_b$ is wider than a point's c point spread function $h_c$. This illustrates that a point spread function is depth dependent, e.g. a distance d2 from point source b to the detector 20 is larger than a distance d3 from the point source c to the detector 20.

With reference again to FIG. 1, the resolution restored 2D images are stored in a 2D image memory 48. A video processor 50 processes the optimized 2D images for a display on an image display 52.

In one embodiment, a 3D reconstruction processor 60 processes the 2D images from the 2D image memory 48 into volumetric image representations. The image representations are stored in a 3D image memory 62 for manipulation by the video processor 50 and displayed on the image display 52 such as a video monitor, printer, or the like.

Figure 3:
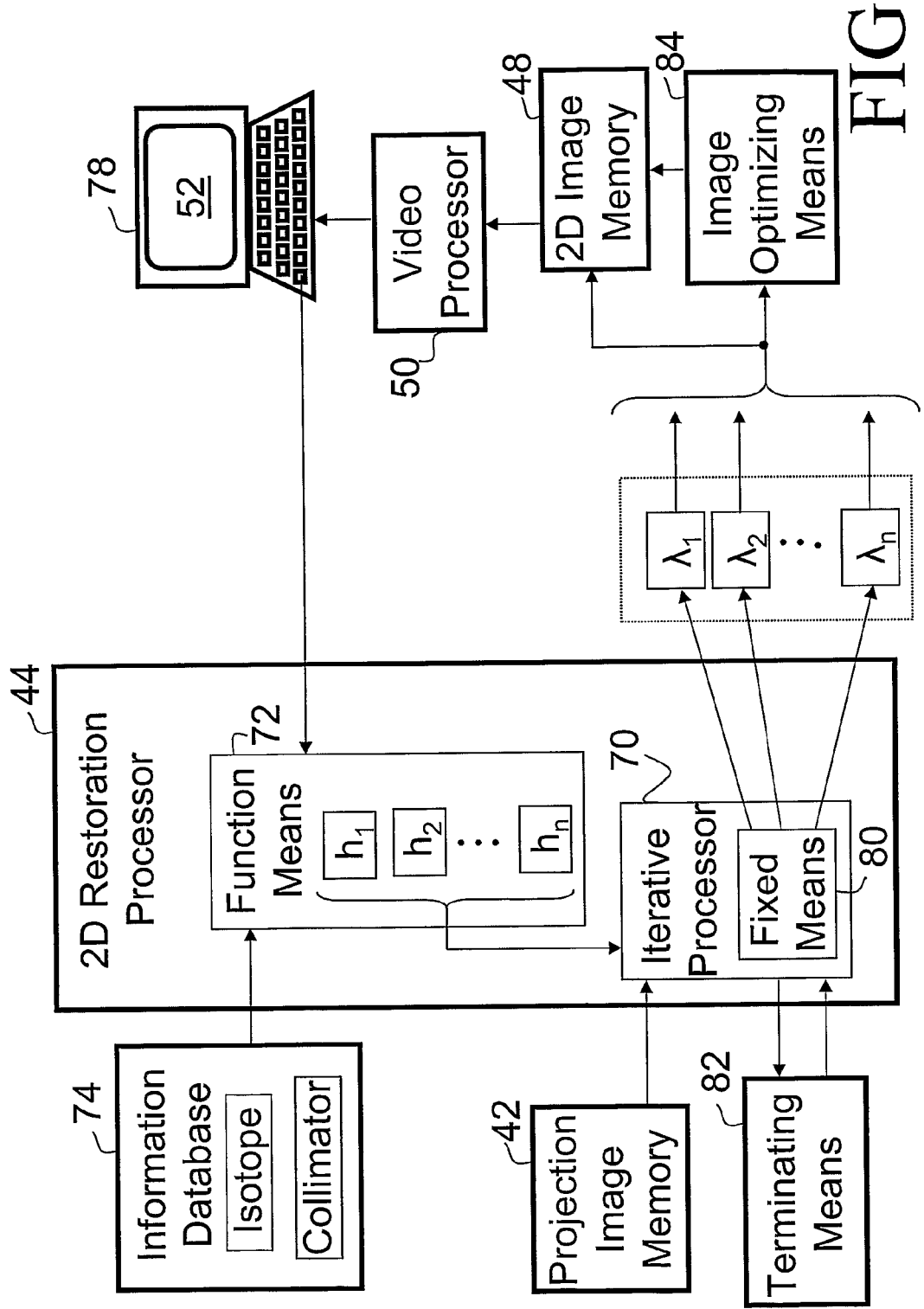
FIG. 3 is a diagrammatic illustration of a portion of an imaging system.

With continuing reference to FIG. 1 and further reference to FIG. 3, an iterative processor or process 70 applies an iterative constrained deconvolution algorithm or process to an original image μ by a use of point spread functions with a known depth. More specifically, a function means 72 determines a series of point spread functions $h_1, h_2, \ldots, h_n$ for different depths based on an input from an information database 74. Preferably, the point spread functions $h_1, h_2, \ldots, h_n$ are determined based on at least one of the isotope administered to the object and the geometry of the collimator 24 which is used for imaging. Of course, it is also contemplated that a user can provide the information for determining the point spread functions $h_1, h_2, \ldots, h_n$ on the fly by using an input means 76, such as keyboard, mouse and the like, of an operator interface station 78. A fixed means or processor 80 applies an iterative constrained deconvolution algorithm or process (ICD) to the original image Ft for each individual point spread function $(h_1, h_2, \ldots, h_n)$ to generate a series of restored images $\lambda_1, \lambda_2, \ldots, \lambda_\mu$.

Preferably, the fixed processor 80 implements a maximum-likelihood (ML) algorithm:

$$\lambda^{(k+1)}(i) = \lambda^{(k)}(i) \sum_l \frac{h(l-i)\mu(l)}{\sum_z h(l-z)\lambda^{(k)}(z)}$$

where h is a known point spread function,
z, l represent the pixel indices for the image,
μ denotes the original image,
$\lambda^{(k)}$ is the restored image at $k^{th}$ iteration, and
i represents the $i^{th}$ pixel in the image.

A terminating means 82 terminates the iterative process 70 based on a prespecified criteria such as a preselected number of iterations, a predefined average contrast in at least a selected region of the image, a predefined standard pixel deviation in at least a selected region of the image, and the like.

The image optimizing means 84, preferably automatically, optimizes or selects the best image from the series of the restored images $\lambda_1, \lambda_2, \ldots, \lambda_\mu$ using a predefined optimization resolution criteria, e.g., the images are optimized by maximizing the contrast-to-noise ratio, signal-to-noise ratio, or certain frequency components. The restored 2D image is stored in the 2D image memory 48.

Of course, it is also contemplated that the optimizing is visually performed by the user. After the initial image is restored or refocused for each point spread function h, each of the restored images is stored in the 2D image memory 48. The series of restored images, each corresponding to a different depth of optimal refocusing is displayed on the display 52. Preferably, the user scrolls through the series to select his/her viewing preference. The display during this process is similar to focusing a microscope based on the depth of the part of the body it is desirable to observe. E.g., if the organs of interest are located close to the camera 16, a point spread function with a small depth results in the image of a better quality; while in other situations, when the organs of interest are further away from the camera 16, a point spread function with a large depth results in a better quality image.

With continuing reference to FIG. 1 and further reference to FIG. 4, the iterative processor 70 applies the iterative constrained deconvolution algorithm to the original image μ by a use of an assumed or unknown point spread function $h_1$. More specifically, the function means 72 estimates an approximation of the point spread function $h_1$. Since the complete knowledge of the point spread function $h_1$ is unknown, a blind deconvolution means or process or processor 86 applies so called blind deconvolution to the original image μ, starting with the approximated point spread function $h_1$. A redefine function processor or means 88 estimates the point spread finction while a redefine image processor or means 90 simultaneously restores the image. The terminating means 82 determines whether the restored image λ is of an acceptable quality by monitoring the blind deconvolution process 86. In the preferred embodiment, the terminating means 82 determines one of whether the average contrast of the image is above a pre-defined threshold, a standard pixel deviation is above a pre-defined standard pixel deviation, and a preselected number of iterations have been performed. A resultant, optimally restored image λ is stored in the 2D image memory 48. Preferably, the blind deconvolution means 86 enhances the contrast of the images without amplifying too much noise and/or without creating false artificial features. Such blind deconvolution process 86 is advantageous since there is no need to know the exact information of the point spread function. The blindly restored point spread function is more accurate than empirically measured one because it is free from noise contamination, and is based on the distortion actually present within the dataset, rather than when the point spread function was measured. As a result, the image restored using the blindly restored point spread function is more robust and statistically more accurate.

Preferably, the blind deconvolution process 86 implements a maximum-likelihood (ML) algorithm, in which the image λ and the point spread function h are estimated concurrently in each iteration:

$$\lambda^{(k+1)}(i) = \lambda^{(k)}(i) \sum_l \frac{\lambda^{(k)}(l-i)\mu(l)}{\sum_z h^{(k)}(l-z)\lambda^{(k)}(z)}$$

$$h^{(k+1)}(b) = h^{(k)}(b) \sum_l \frac{\lambda^{(k)}(l-b)\mu(l)}{\sum_z \lambda^{(k)}(l-z)h^{(k)}(z)},$$

where $h^{(k)}$ is the estimated point spread function at $k^{th}$ iteration;

z, l represent the pixel indices for the image,

μ denotes the original image, $\lambda^{(k)}$ is the restored image at $k^{th}$ iteration, and i represents the $i^{th}$ pixel in the image.

The deconvolution process has been described with reference to the entire projection image for simplicity of illustration. Of course, a single image can be optimized on a regional basis with each of plural regions being optimized to different point spread functions. In this manner a region with a shallow organ of interest and another region of the same image with a deep organ of interest can both be optimally and resolutionally restored.

The iterative constrained deconvolution technique can be used to restore the resolution in 3D images. In one embodiment, the iterative constrained deconvolution is applied to 3D images after 3D image reconstruction by using the 3D volumetric response function. In another embodiment, the iterative deconvolution is applied to each 2D projection before SPECT reconstruction. In yet another embodiment, the iterative deconvolution is incorporated into the 3D SPECT reconstruction process.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus descried the preferred embodiments, the invention is now claimed to be:

1. A medical imaging system comprising:
   a radiation detection head disposed adjacent a subject receiving aperture to detect radiation from a subject;
   one or more processors programmed to:
      reconstruct the detected radiation into at least one initial 2D projection image,
      apply a blind iterative constrained deconvolution algorithm to each initial 2D image to iteratively restore resolution of the initial 2D image with a plurality of system response functions which is each representative of a corresponding distance between the radiation detection head and an origin of the detected radiation, an initial system response function being adjusted in iterative repetitions of image resolution restoring deconvolutions of the blind iterative constrained deconvolution algorithm.

2. The system as set forth in claim 1, wherein the one or more processors are further programmed to:
   iteratively redefine the 2D image; and
   iteratively redefine the system response function, including iteratively restoring the 2D image and iteratively redefining the system response function concurrently.

3. The system as set forth in claim 2, the one or more processors are further programmed to:
   terminate the redefining the 2D image and the system response function based at least on one of:
      a preselected number of iterations,
      a predefined average contrast in at least a selected region of the image, and
      a predefined standard pixel deviation in at least a selected region of the image.

4. The system as set forth in claim 1, wherein the blind deconvolution applies a statistical estimation algorithm to estimate concurrently the restored 2D image and the response function, which statistical estimation algorithm is at least one of:
   maximum-likelihood,
   maximum a posterior,
   conjugate gradient, and
   Bayesian.

5. The system as set forth in claim 1, wherein each of the plurality of system response functions corresponds to each of a plurality of distances between the radiation detection head, and the origin of the detected radiation and the one or more processors are further programmed to:
   apply a fixed iterative constrained deconvolution algorithm to the initial 2D image for each of the system response functions to generate a series of restored 2D images for the initial 2D image.

6. A medical imaging system comprising:
   at least one radiation detection head disposed adjacent a subject receiving aperture to detect radiation from a subject;
   one or more processors programmed to:
      reconstruct the detected radiation into at least one initial 2D projection image,
      apply a fixed iterative constrained deconvolution algorithm to iteratively restore resolution of the initial 2D projection image with a plurality of system response functions which is each representative of a corresponding distance between the radiation detection head and an origin of the detected radiation to generate a series of restored 2D images, and
      terminate applying the fixed iterative constrained deconvolution algorithm based at least on one of:

a preselected number of iterations,
a predefined average contrast in at least a selected region of the image, and
a predefined standard pixel deviation in at least a selected region of the image.

7. The system as set forth in claim 6, wherein the one or more processors is further programmed to optimize the series of restored 2D images to select an optimally resolution restored image; and further including:
a monitor for displaying the optimally resolution restored image in a user viewable format.

8. The system as set forth in claim 7, wherein the series of restored 2D images are optimized by one of:
maximizing a contrast-to-noise ratio, and
maximizing a signal-to-noise ratio.

9. The system as set forth in claim 6, further including:
a user input and a display, with which a user scrolls through the series of restored 2D images.

10. The system as set forth in claim 6, further including:
an information database which provides information to the one or more processors, based on which information the one or more processors are programmed to generate a plurality of system response functions and wherein the information includes at least one of:
a name of an isotope administered to the subject, and
a geometry of a collimator.

11. A medical imaging system comprising:
at least one radiation detection head disposed adjacent a subject receiving aperture to detect radiation from a subject;
a unit which reconstructs the detected radiation into at least one initial 2D image; and
an iterative constrained deconvolution unit which applies a fixed iterative constrained deconvolution algorithm for iteratively restoring resolution of the initial 2D image with a plurality of system response functions which is each representative of a corresponding distance between the detection head and an origin of the detected radiation to generate a series of restored 2D images for the initial 2D image, the fixed iterative constrained deconvolution algorithm applying a statistical estimation algorithm to estimate each restored 2D image which statistical estimation algorithm is at least one of:
maximum-likelihood,
maximum a posterior,
conjugate gradient,
and
Bayesian.

12. A method of medical imaging comprising:
reconstructing radiation detected from a subject with a detection head into an initial 2D image; and
arbitrarily assigning an initial system response function;
iteratively restoring resolution in the initial 2D image by a use of an iterative constrained deconvolution which, with at least one processor, applies a plurality of system response functions which functions correspond to distances between the detection head and origins of the detected radiation, including:
applying a blind iterative constrained deconvolution algorithm to the initial 2D image starting with the initial system response function; and
concurrently iteratively redefining the deconvolved image and the system response function.

13. The method as set forth in claim 12, further including:
terminating the steps of redefining the 2D image and the system response function based at least on one of:
a preselected number of iterations,
a predefined average contrast in at least a selected region of the image; and
a predefined standard pixel deviation in at least a selected region of the image.

14. The method as set forth in claim 12, wherein the restoring step further includes:
applying a statistical estimation algorithm which includes at least one of maximum-likelihood, maximum a posterior, conjugate gradient, and Bayesian to estimate concurrently an updated 2D image and an updated response function.

15. A method of medical imaging comprising:
reconstructing radiation detected from a subject by a detector head into an initial 2D image; and
iteratively restoring resolution in the initial 2D image by using at least one processor to apply an iterative constrained deconvolution algorithm which applies a plurality of system response functions which functions correspond to distances between the detection head and origins of the detected radiation, including:
applying a statistical estimation algorithm which includes at least one of maximum-likelihood, maximum a posterior, conjugate gradient, and Bayesian to estimate an updated 2D image.

16. The method as set forth in claim 15, wherein the iterative resolution restoring step includes:
applying a fixed iterative constrained deconvolution algorithm to the initial 2D image for each of the plurality of system response functions, which each corresponds to one of a plurality of distances between the detection head and the origin of the detected radiation, to generate a series of restored 2D images.

17. A method of medical imaging comprising:
detecting radiation data from a subject with a detection head;
reconstructing the detected radiation into an initial 2D image;
iteratively restoring resolution in the initial 2D image, with at least one processor, by applying a fixed iterative constrained deconvolution algorithm which applies a plurality of system response functions which correspond to distances between the detection head and origins of the detected radiation; and
terminating the step of applying the fixed iterative constrained deconvolution algorithm based at least on one of:
a preselected number of iterations,
a predefined average contrast in at least a selected region of the image; and
a predefined standard pixel deviation in at least a selected region of the image.

18. The method as set forth in claim 17, wherein applying the fixed iterative constrained deconvolution algorithm which applies the plurality of system response functions generates a series of restored 2D images and further including:
optimizing the series of restored 2D images by at least one of:
maximizing a contrast-to-noise ratio, and
maximizing a signal-to-noise ratio.

19. The method as set forth in claim 18, further including:
displaying the series of restored 2D images in a human readable format on a display device.

20. The method as set forth in claim 19, wherein the displaying includes:
serially displaying the images in an order by effective depth of optimum resolution restoration; and under operator control, moving back and forth through the series of images to select an optimal image.

21. A method of medical imaging comprising:
detecting radiation at a plurality of angular positions around the subject with at least one detection head;
reconstructing an initial 2D image corresponding to each angular position;
for each initial 2D image, iteratively restoring resolution in the initial 2D image by a use of an iterative constrained deconvolution which applies a plurality of system response functions which functions correspond to distances between the detection head and origins of the detected radiation;

selecting an optimally resolution restored 2D image for each of the angular positions; and
from the optimally resolution restored 2D images, reconstructing a 3D image representation.

22. A non-transitory computer-readable medium carrying computer code which controls one or more processors to perform the method of claim 12.

23. A non-transitory computer-readable medium carrying software which controls one or more processors to perform the method of claim 15.

* * * * *